May 13, 1952  C. A. FRICK  2,596,230
COIN-CONTROLLED MACHINE FOR ISSUING FOLDERS
Filed Aug. 20, 1947  8 Sheets-Sheet 3

Fig. 7.

INVENTOR
Chester A. Frick
BY
ATTORNEY

May 13, 1952 C. A. FRICK 2,596,230
COIN-CONTROLLED MACHINE FOR ISSUING FOLDERS
Filed Aug. 20, 1947 8 Sheets-Sheet 6

INVENTOR
Chester A. Frick
BY
ATTORNEY

May 13, 1952　　　　　　　　C. A. FRICK　　　　　　　2,596,230
COIN-CONTROLLED MACHINE FOR ISSUING FOLDERS
Filed Aug. 20, 1947　　　　　　　　　　　　　　　8 Sheets-Sheet 7

Fig. 14.

INVENTOR
Chester A. Frick
BY
ATTORNEY

Patented May 13, 1952

2,596,230

UNITED STATES PATENT OFFICE 2,596,230

COIN-CONTROLLED MACHINE FOR ISSUING FOLDERS

Chester A. Frick, Glendale, Calif., assignor to Leo M. Harvey, Los Angeles, Calif.

Application August 20, 1947, Serial No. 769,612

5 Claims. (Cl. 101—287)

This invention has to do with a coin controlled machine for issuing folders and receiving coupons therefrom, and it is a general object of the invention to provide a machine of this character which is simple, dependable and easily operated.

I am aware of the fact that coin controlled machines have been provided for handling or dispensing a wide variety of products or articles. However, the articles that I wish to handle are not merely dispensed but rather are issued, to have distinguishing characteristics, and furthermore, it is required that the operator of the machine perform certain acts with the material received from the machine, preferably including the deposit in the machine of a coupon detached from the material received from the machine. In the particular example of an application of my invention that I have elected to set forth, the machine handles a folder having parts to be written upon or filled out by the operator following issue of the folder from the machine, and it includes a detachable coupon of a particular size to be deposited in the machine following issue, whereas the remainder of the folder is too large for such deposit. As each folder is issued it is desirable that it be marked with distinguishing characteristics or certain information, as for instance, the time of issue from the machine.

The machine of the present invention may, for example, be used to issue material necessary or incidental to the purchase of insurance, say for instance, accident insurance, in which case the folder issued by the machine may be an application for insurance, an application being procured by the operator upon deposit of a suitable coin and subsequent operation of the machine. Matter written on the coupon may serve as an identification or information such as may be desirable or required by law, and when the coupon is deposited in the machine the operator has completed the acts required of him and he has in his possession the remainder of the folder serving as a receipt. The machine that I provide dates the folder on the receipt portion and the coupon portion providing a necessary or desirable key marking of the coupon and receipt.

It is a general object of my present invention to provide a machine of the general character referred to, which is coin controlled and which serves to effectively and dependably dispense a folder or the like bearing the time of issue of the folder from the machine, the machine being fully operated by mere deposit of a suitable coin and subsequent actuation of a simple manual operating member, such as a lever.

Another object of the present invention is to provide a machine of the general character referred to involving a simple, practical case, the hood element of which has a stepped top, one step of which forms a writing platform convenient for the operator to use when writing upon material issued by the machine.

Another object of the invention is to provide a machine of the general character referred to involving a simple, unique, and dependable ejecting device operable to eject folders from the machine as the machine is operated.

It is a further object of the invention to provide a simple, improved, dependable, marker and operating means therefor whereby the time of issue of each folder is stamped thereon in the course of the folder being issued from the machine.

Another object of the present invention is to provide a machine of the character referred to wherein the working parts and the magazine carrying a supply of folders are arranged and related in the case in a group, leaving a substantial space in the case for a receptacle to receive the coupons returned to the machine.

The various objects and features of my invention will be fully understood from the following detailed description of typical preferred forms and applications of the invention, throughout which description reference is made to the accompanying drawings, in which:

Fig. 1 is a perspective view showing a machine embodying the present invention taken to illustrate the various openings provided in the case of the machine, and to show the writing platform provided by the case, and to show the location of the operating lever. Figs. 2, 3 and 4 illustrate a folder such as may be handled by the machine, Fig. 2 being a perspective view of the folder showing the leaves thereof partially spread. Fig. 3 is a plan view of the large leaf of the folder which may serve as the receipt, showing it separated from the small leaf which serves as the coupon. Fig. 4 is a view similar to Fig. 3, showing the small leaf or coupon of the folder detached from the large leaf. Fig. 5 is an enlarged side elevation of the machine shown in Fig. 1, taken from the side appearing in Fig. 1 with parts broken away to show the general arrangement of essential elements within the case.

The machine that I have provided is intended, generally, to handle printed matter or the like, as for instance cards, leaflets, folders, or like objects, and it is more specifically intended to handle leaflets bearing detachable parts or coupons to be returned to the machine after being dispensed. The particular form of the invention shown in the drawings is intended to handle folders A each of which involves leaves 10 and 11 joined together along a line of fold or hinge 12 and adapted to normally lie together or one against the other, so that a plurality of such folders may be arranged in the machine in a stack S. The particular folder handled by the present machine is such that the two leaves are of different extent, one of them being smaller than the other, and in the nature of a coupon adapted to be returned to the machine after the folder has been dispensed therefrom and the said coupon part has been separated from the other leaf. In the drawings I have illustrated a folder formed of a rectangular sheet of material such as paper or cardboard, which sheet has a single bend or fold at 12 forming a hinge, the bend or fold being located to establish the leaves 10 and 11 so that they are elongate in form, the leaf 10 being substantially wider than the leaf 11 which I will refer to as the coupon. The line of fold 12 occurring at one longitudinal edge of the coupon may be perforated or otherwise weakened so that it will tear readily allowing the leaves 10 and 11 to be torn apart when it is desired to deposit the coupon in the machine.

A further feature of the folder A as shown for use in the form of machine illustrated in Figs. 1 to 14 of the drawings, is the provision of a body 13 of transferable material such as carbon or the like on the inner side of one of the leaves. In the case illustrated the transferable material 13 is deposited on the inner side of leaf 10 and is in the form of a strip or band extending transversely of the leaf, and is located lengthwise of the leaf to occur in register with the plate and platen of the marker or printer hereinafter described so that when the printer makes an impression or imprint upon the outer side of the leaf 10 a copy thereof is made upon the inner side of the coupon 11 through the transfer of the material 13.

The machine proper may, in practice, vary widely in form, size, capacity and intricacy. However, I prefer that it be a simple, compact device that will handle a reasonable number of folders A and coupons 11 and further I prefer that it be a machine suitable for mounting on counters, pedestals, or on other like supports such as are commonly available in public places.

The machine proper illustrated in Figs. 1 to 14 involves, generally, a case B carrying or housing the various other elements hereinafter described, a frame C located in the case, a magazine D located in the case to carry a pack or supply of folders A, feed means E for the folders carried in the magazine D, means F for ejecting folders from the magazine one at a time, operating means G for the various principal working parts of the machine, a drive H between the operating means G and the means F, a marker J operable to print upon the folders as they are dispensed from the machine, a drive K for the marker, a coin control mechanism L governing the operating means G, lock-out means M operable to lock the machine out of operation when the supply of folders is exhausted from the magazine, and various other features and devices as will be hereinafter described.

The case B involves, generally, a base or bottom 14 and a hood 15. The base may be a simple horizontally disposed plate-like portion carrying the frame C and various other elements of the machine and it is preferably provided with a marginal flange or rest 16 on which the lower edge of the hood bears. The hood 15 is shown as a downwardly faced box-like shell and in accordance with my invention it involves, generally, a short vertical front 17, a high vertical back 18, a stepped top having a forward lower step 19, a rear high step 20 and a riser 21 extending between the steps and the sides 22 closing the hood at its ends. It is a feature of my construction that the lower or bottom step 19 of the hood be substantially flat and free of obstructions and that it be of substantial size in order to form a writing surface convenient for a user of the machine. In the course of use of the machine a folder dispensed therefrom may be a form such for example as an application form containing blanks to be filled in by the person procuring it from the machine, and the step 19 of the hood forms a convenient rest for the folder as it is being filled in. The rear upstanding portion of the hood houses parts of the mechanism and forms a part which is conspicuous and suitable for bearing notices, advertisements, or other like material. The hood 15 is shiftable relative to the base 14. In the preferred form of the invention it is entirely separable from the base and is normally locked or secured thereto by suitable key controlled locks 23.

In accordance with my invention the hood 15 is provided with several openings or apertures, all of which are related and located in a most convenient and advantageous manner. For example, a delivery opening 24 is provided in the front 17, a return or deposit opening 25 is provided in the top step 20, a coin receiving slot 26 is provided in the upper portion of the riser 21, and a notch 27 is provided in the lower edge of one side 22 to accommodate a part of the coin control mechanism which part carries the operating lever of means G.

It is significant to note that the delivery opening 24 is of substantial length or extent being wide enough to readily pass a folder as it is dispensed from the machine through the mechanism that I will describe, whereas the return or deposit opening 25 is a narrow opening or is of limited extent barely wide enough to receive or accommodate the narrow coupon leaf 11 when such leaf is inserted in the opening 25 endwise. Through this relationship of openings confusion is minimized since the return or deposit opening is obviously designed to receive only the coupon 11 and a person is not likely to attempt to deposit the wider leaf 10.

The frame C is carried by or attached to the base 14 to be supported thereby and to form a mounting or carriage for the various parts of the mechanism carried within the case. In accordance with my invention the frame involves but three main parts which are in the form of spaced parallel upstanding plates 30, 31 and 32. The plate 30 is of limited vertical extent, that is, it is a short plate fixed to the base 14 and projecting upwardly therefrom immediately inside of the side 22 of the hood 15 which is provided with the notch 27. The plates 31 and 32 are substantially identical plates secured to an upstanding flange 33 on the base 14 adjacent the rear wall 18 and they are grouped together in spaced relation at or close to the center of the case B or substantially midway between the sides 22 of the hood, leaving a substantial space remote from the notched side 22 to accommodate a coupon receptacle 34 as clearly illustrated in Fig. 6 of the drawings. In the particular form of the invention illustrated the forward edge portions of the plates 31 and 32 are fixed to a bulkhead 35 anchored to and projecting upward from the base 14. The plates 31 and 32 may be of substantially the same shape and each has a forwardly projecting portion $a$ beneath the lower step 19 of the hood and an upwardly projecting rear portion $b$ within the top portion of the hood as defined behind the riser 21.

Figures 1, 2, 3, 4, 5:
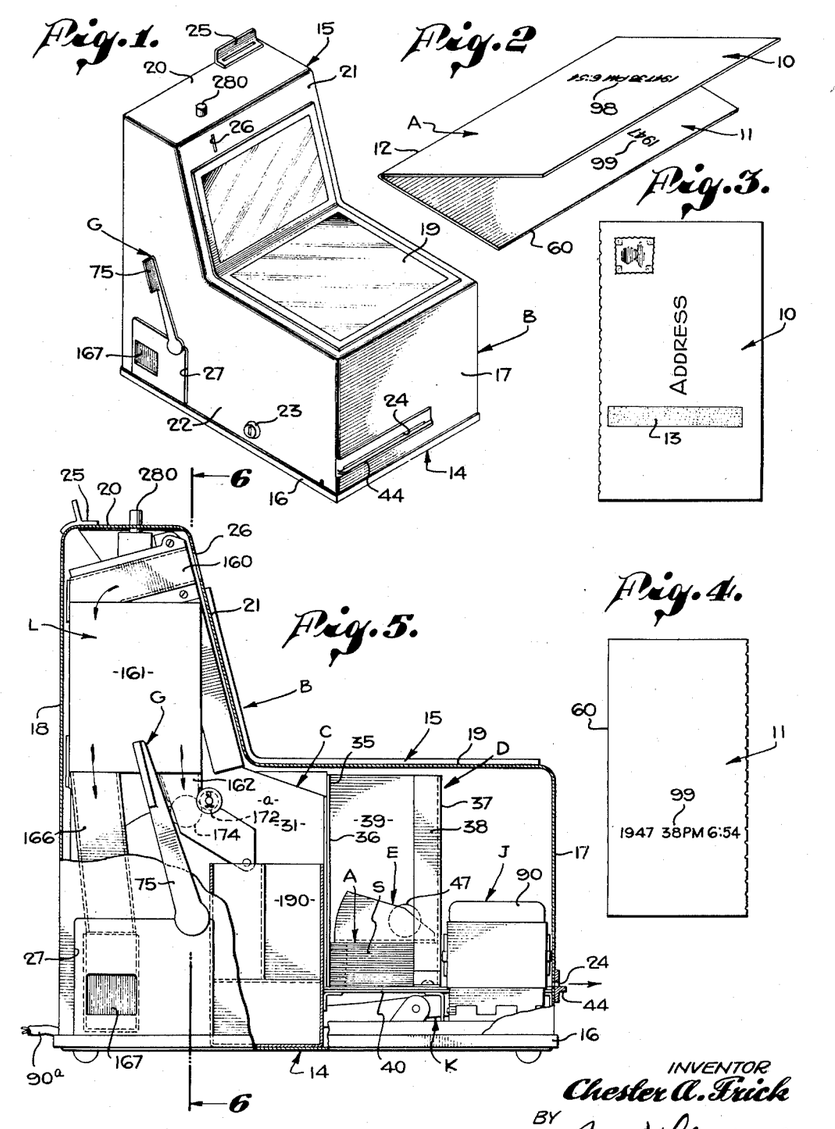
Figure 7:
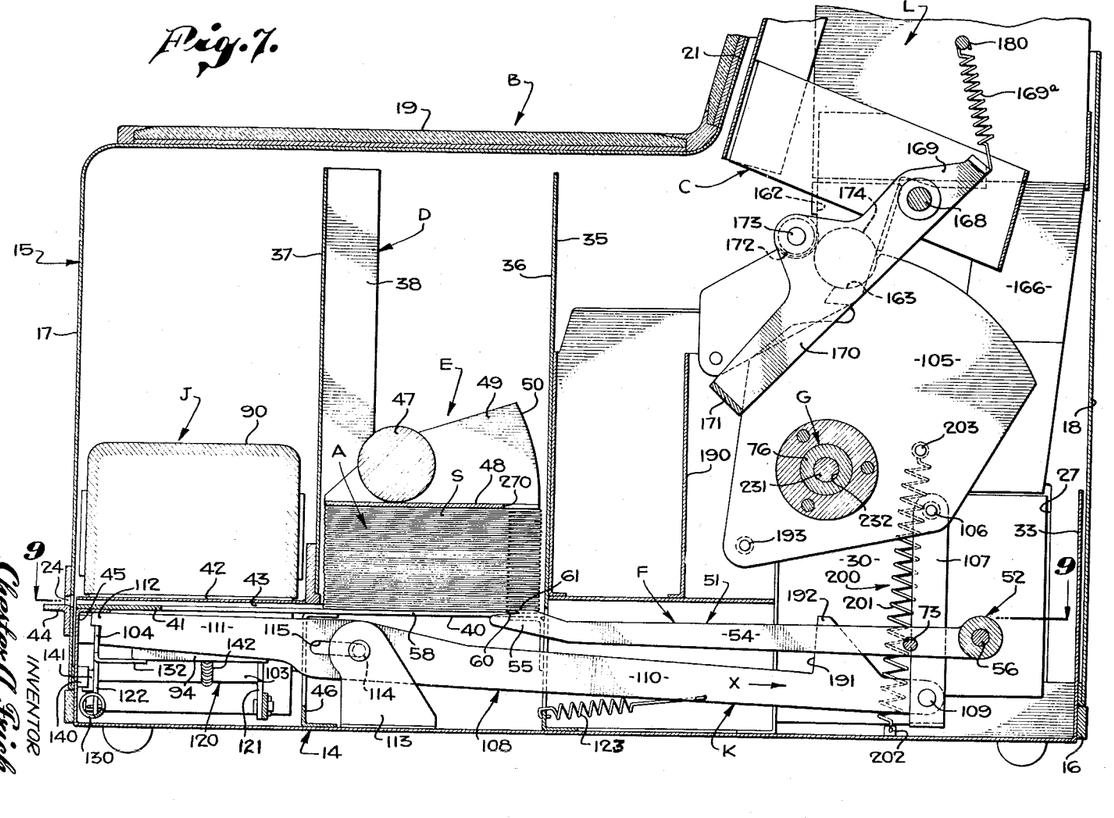
Fig. 7 is a detailed sectional view taken substantially as indicated by line 7—7 on Fig. 6 indicating the working parts in the normal or unactuated position and showing a coin deposited in the machine rendering the machine ready for operation.

The magazine D is designed to carry a supply of folders A and it preferably carries the folders so that they are horizontally disposed or in stacked relation or in a vertically extending stack, as illustrated in Figs. 5 and 7 of the drawings. The magazine D is preferably located in the forward portion of the case B beneath the lower step 19 of the case and spaced rearward from the front 17 of the case so that the printer J is accommodated between the magazine and the front of the case.

The particular magazine D illustrated in the drawings involves suitable vertical parts which guide the supply of folders A in the desired stacked relation. In accordance with my construction I utilize the forward side or face 36 of bulkhead 35 as the rear wall of the magazine. The magazine also involves a front wall 37 which is vertically disposed and spaced a suitable distance forward from the wall face 36 and end walls 38 and 39. The end wall 38 is shown as a flange projecting from front wall 37 whereas wall 39 is shown extending between the front wall 37 and the bulkhead 35. I provide the magazine D with a bottom 40 which is preferably horizontally disposed and forms a rest that carries the pile or supply S of folders.

I provide the bottom 40 with a forward extension 41 which extends horizontally forward from the magazine or beyond the front wall 37 of the magazine to a point immediately inside the front 17 of the case B. A suitable guard plate 42 is carried by the extension 41 so that it is spaced far enough above the folder carrying portion or extension 41 to form a passage 43 through which a folder may pass from the magazine to the front of the machine. The extension 41 and guard plate 42 are located so that the opening or passage 43 formed thereby registers with the delivery opening 24 in the front 17 of the case. In practice I may provide the front of the case with a suitable frame plate 44 around the delivery aperture which plate may have a projecting lip or shelf to guide a folder as it issues from the machine. In the particular form of the invention illustrated the bottom 40 and its extension 41 are supported in the proper horizontal position by a front leg 45 and intermediate leg 46.

The feed means E for the folders A carried in the magazine D is preferably a gravity actuated means involving primarily a weight 47 attached to a plate 48 which may substantially correspond in plan configuration with the folders. Since the folders are not simple cards but rather are doubled back to be of double thickness at parts they may not always stack truly or uniformly and there may be a tendency for the stack to be thicker at the hinged edge than at the other edge. In order that the means E may work properly I preferably provide a pair of guide flanges 49 projecting upwardly from the plate 48 and having arcuate edges 50 which maintain proper bearing engagement with the front face 36 of bulkhead 35.

The means F provided for ejecting folders from the magazine so that they are fed from the magazine through the passage 43 to project from the front of the case so that they can be gripped and removed by a person operating the machine includes one or more ejectors 51, mounting means 52 for the ejectors, and means 53 normally yieldingly urging the ejectors against the lowermost folder in the magazine. In the particular form of the invention illustrated I have shown two ejectors 51 each in the form of a finger 54 with a hook head 55 at its forward or outer end and with its inner or rear end carried by the mounting means 52 through a pivot pin 56. The heads 55 of the fingers operate in longitudinally disposed slots 58 provided in the bottom 40 of the magazine and continuing forward into the extension 41 of the bottom. In the preferred arrangement the fingers 54 are spaced apart horizontally as clearly shown in Fig. 9 of the drawings.

Figure 14:
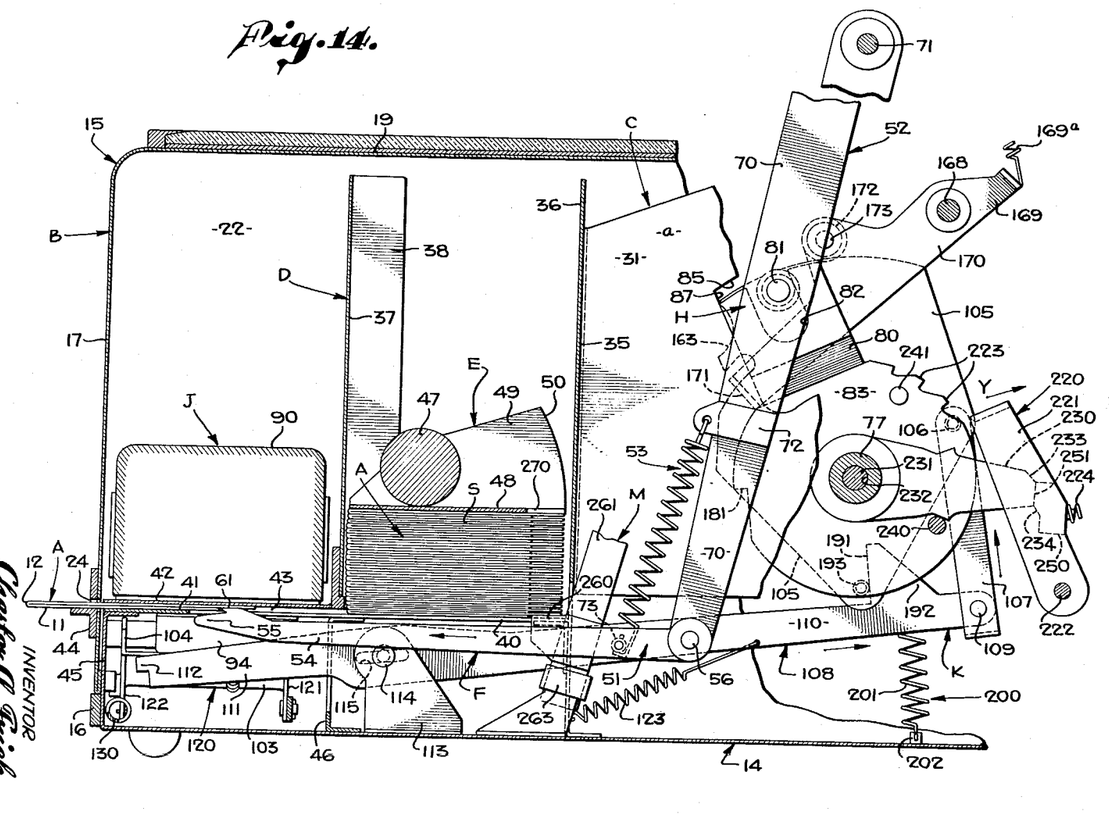
Fig. 14 is a view similar, generally, to Fig. 8 but showing the machine fully operated and illustrating parts not shown in Fig. 8 and not showing certain parts shown in Fig. 8.

When the fingers are in the withdrawn or retracted position as shown in Fig. 7 the hook heads of the fingers are rearward of the free edge 60 of the coupon leaf of the lowermost folder in the magazine so that hooks 61 on the heads will engage the edge 60 of this coupon leaf upon the fingers being moved forward or toward the front 17 of the case. When the machine is operated the fingers 54 move forward from the position shown in Fig. 7 to an advanced or operated position such as is shown in Fig. 14 where the leaf 11 that has been engaged by the hooks has been advanced horizontally forward through the passage 43 to move the folder of which it is a part to a position where it projects somewhat forward from the case as illustrated in Fig. 14. From the forward or projecting position shown in Fig. 14 the folder is accessible and the operator can readily withdraw it from the machine. As the fingers are retracted or moved from the position shown in Fig. 14 to that shown in Fig. 7 the hook-heads drag rearwardly beneath the lowermost folder in the magazine and finally returns to a position ready to be again advanced into engagement with the edge 60 of the lowermost folder in the magazine.

The mounting means 52 for the fingers 54 may involve a single pivoted arm 70, the upper end of which is pivoted in a fixed position in the upper portion of the case by a pivot pin 71 while its lower end portion carries the pivot pin 56 to which the fingers are attached. The pivot pin 71 is carried between the upwardly projecting portions b of the frame plates 31 and 32 and the arm 70 depends from its point of pivotal support in the upper portion of the case to the lower portion of the case where it carries the pin 56 in substantial alignment with the bottom of the magazine. By thus relating the parts the arm 70 is of considerable length and consequently as it operates between the positions shown in Figs. 8 and 14 there is little vertical movement of the pivot pin 56 and consequently a negligible tilting of the fingers 54.

The means 53 included in means F serves to normally yieldingly urge the fingers 54 upwardly to hold the hook ends 55 in suitable bearing engagement with the card being operated or the lowermost card in the magazine as the case may be. As shown in the drawings the means 53 involves a simple helical tension spring anchored to a bracket 72 projecting from arm 70 and coupled to a pin 73 extending between the fingers 54 a suitable distance forward of the pivot pin 56.

Figure 6:
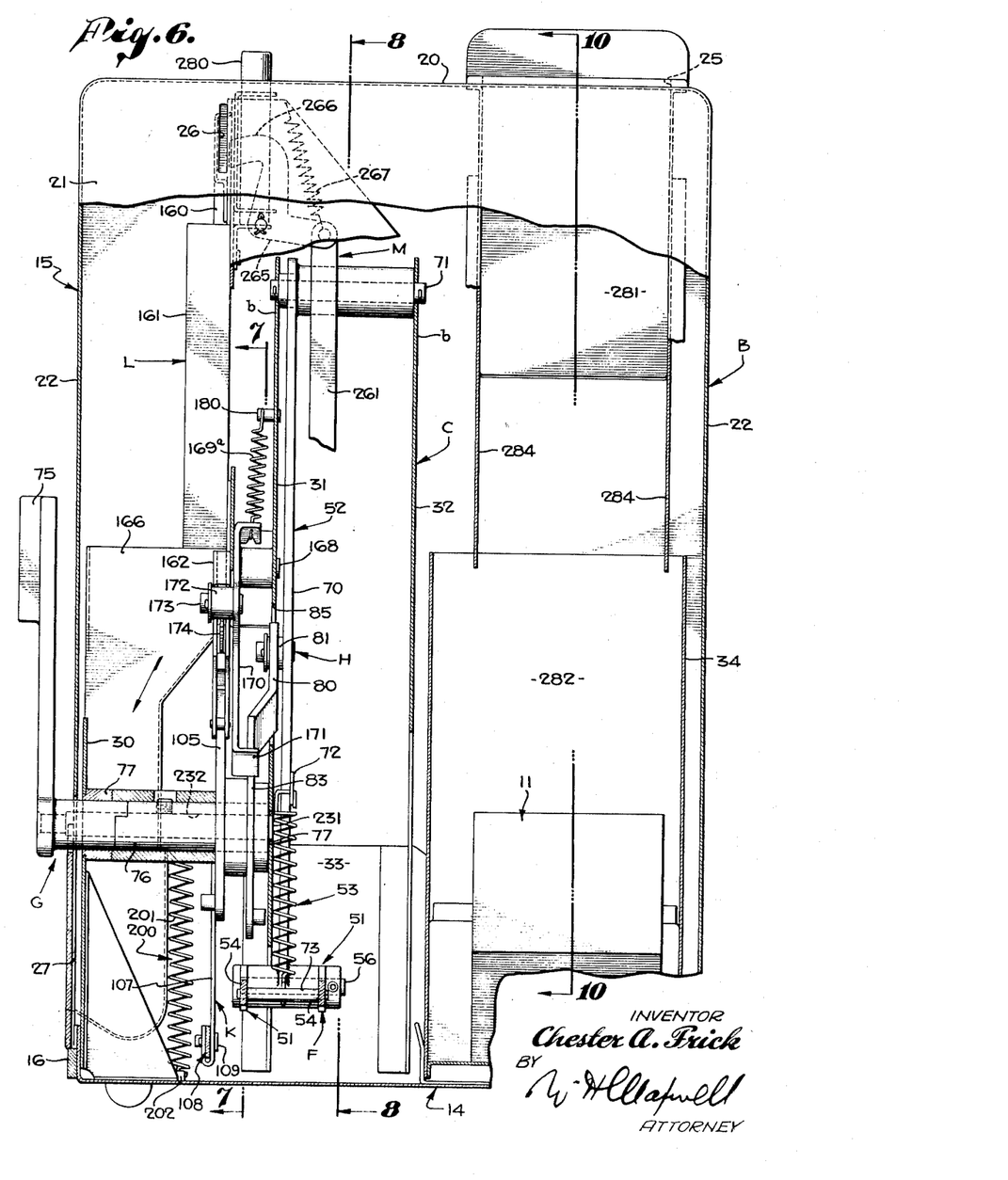
Fig. 6 is an enlarged sectional view of the machine taken substantially as indicated by line 6—6 on Fig. 5.

The operating means G for the machine operates the various essential working parts and in the form of the invention illustrated the means G includes, generally, a manually operable member 75 at the exterior of the machine and an operating shaft 76 extending into the machine, as shown in Fig. 6 of the drawings. The manual operating member 75 may be a simple lever such as I have shown in Figs. 1, 5 and 6 of the drawings and this lever may be fixed to the shaft 76 so that when the lever is swung the shaft is positively rotated. In the drawings I have shown the shaft rotatably supported in a bearing 77 carried by plates 30 and 31 of the frame C.

The drive H for the ejector means F provides a connection between the shaft 76 of means G and the arm 70 that carries the ejector fingers 54. The means H as shown in the drawings involves, generally, a lever arm 80 fixed to shaft 76 and a drive pin 81 projecting from the ejector arm 70 to extend into a radial opening or guideway 82 provided in the arm 80. The opening or guideway 82 is of considerable extent radially of the arm 80 and may be formed by notching the arm from its outer end as shown in the drawings. The cooperative engagement of the drive pin 81 with the notched arm 80 is such that when the arm 80 is carried around with the shaft 76 the arm 70 of the ejector means is operated with consequent operation of the ejector fingers. It is to be observed that the width of the notch 82 exceeds the diameter of the drive pin with the result that there is slack or play in the drive just described allowing the shaft 76 to move somewhat before the arm 70 is picked up and moved, as will be clearly understood from an examination of Fig. 13 of the drawings, where the shaft 76 is shown partially rotated, whereas no movement of arm 70 has yet occurred.

The means H further includes stop means positively limiting the travel of arm 80, the permitted travel being such as to allow full operation of the ejector means F. In the preferred form of my invention the stop means is provided by forming the arm 80 on a disc 83 on shaft 76 and by offsetting the arm in a direction axial of the shaft so that it enters or projects through or into an arcuate aperture 85 provided in plate 31. The end 86 of aperture 85 stops the arm 80 in its retracted or unactuated position while the end 87 stops the arm 80 in its fully operated position, these positions being shown in Figs. 8 and 14, respectively.

Figures 15, 16:
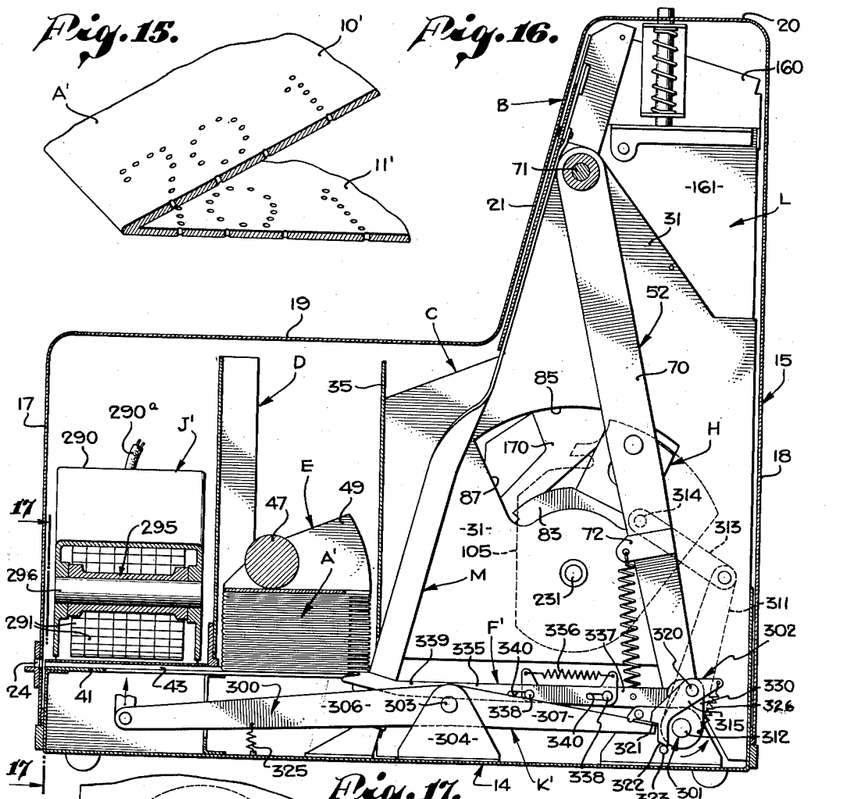
Fig. 15 is a perspective view showing a section of folder stamped by the form of machine illustrated in Fig. 16 and 17 of the drawings.
Fig. 16 is a general sectional view of a modified form of machine taken in the same general direction as Fig. 8.
Figure 17:
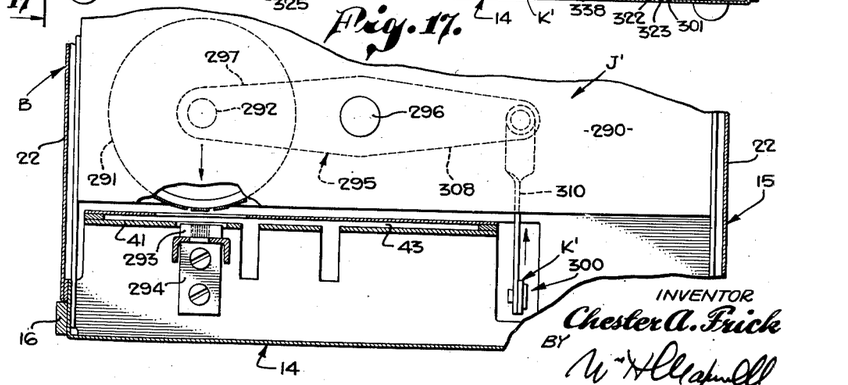
Fig. 17 is a sectional view taken as indicated by line 17—17 on Fig. 16.

The marker J in accordance with my invention is located in the case B between the front 17 of the case and the magazine D and it operates to print on or to apply an impression to each folder issuing from the machine. The marker is located to operate on each folder as the folder passes over the extension 41 of the magazine or passes through the passage 43 hereinabove described. In the particular machine illustrated the primary purpose of the marker J is to stamp upon each folder issuing from the machine the time of issue and consequently I employ or provide a marker involving a timing device. The marker or printer that may stamp or print as is the case in Figs. 1 to 14, or which may stamp or perforate as shown in Figs. 15 to 17 may be a standard or typical electrically operated mechanism and when I refer to marking I mean to include printing perforating, or any like or similar means of marking.

In the form of the invention illustrated in Figs. 1 to 14 of the drawings I have shown a standard or typical electrically operated time stamping mechanism the principal working parts of which are housed in a case 90, the mechanism being driven electrically through a line 90ª. My present invention is not concerned in any way with the details of the time printer and I may in carrying out the invention use time printers of different forms or types. In the case illustrated I have shown a time printer in which the printing plate is formed by a plurality of rotatable discs 91 carried on a shaft 92 while an inking ribbon 93 is fed across the face of the printing plate and a platen 94 is operable to cooperate with the plate. In the particular arrangement illustrated the disc type printing plate above mentioned is located immediately above the extension 41 of the magazine between or above the guard plate 42 above described while the platen 94 in its unactuated position is immediately below the plate and the extension 41 of the magazine bottom 40.

The extension 41 and the guard plate 42 have registering apertures 95 and 96 where the platen 94 opposes the printing plate of the marker so that the platen may be worked or operated upwardly toward the plate to cause a folder A located between the platen and the plate to be moved into printing engagement with the plates, this latter operation being performed with sufficient force to cause transfer of the material 13 from leaf 10 to leaf 11. It is to be understood that the ribbon occurring between the plate and the top of the folder beneath the plate supplies ink so that permanent printing 98 is applied to the top of the leaf 10. Printing 99 applied to the coupon leaf 11 through the transferable material is shown in Figs. 2 and 4 of the drawings. It is to be understood that with the type of marker illustrated in Figs. 1 to 14 of the drawings the several discs 91 of the plate are from time to time rotated or advanced through suitable drive means (not shown) incorporated in the case 90 so that the printed record applied to each folder as it issues from the machine gives the time of issue. The particular printing mechanism illustrated in Figs. 1 to 14 of the drawings has a depending operating lever 100 to be actuated each time the printer operates, which lever serves to advance the ribbon 93.

Figure 12:
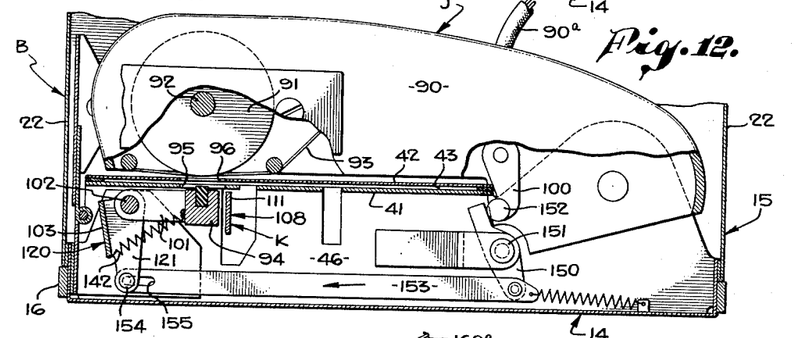
Fig. 12 is a sectional view taken substantially as indicated by line 12—12 on Fig. 9.

In the form of the invention illustrated in Figs. 1 to 14 the platen 94 is shown carried by arms 101 supported on a fixed pivot shaft 102, the arms being horizontally disposed, as clearly shown in Fig. 12 of the drawings. The plate of the printer being constantly energized through the feed line 90ª so that the plate is always adjusted to print the correct time it is necessary to provide the drive means K for operating the platen 94 each time a folder is issued from the machine. The drive means K illustrated in the drawings includes, generally, a plate 105 fixed on shaft 76, a pivot pin 106 projecting from the plate, a link 107 pivotally carried by the pin 106 and depending therefrom and having its lower end pivotally connected to a latch lever 108 by a pivot pin 109. The plate 105 is spaced somewhat from the disc 83 which is also secured to the shaft and the pivot pin 106 is so located on the plate 105 as to have considerable vertical movement when the shaft 76 is rotated through operation of the lever 75. The link 107 extends downwardly from pin 106 and is pivotally connected to the rear end of the long arm 110 of the latch lever 108. The latch lever 108 is shiftably pivotally supported and has a short arm 111 in the forward end portion of the case beneath the extension 41 which short arm has a hook portion 112 projecting from its forward end movable vertically as the latch lever is pivoted and movable horizontally as the latch lever is shifted.

The mounting that I have illustrated for the latch lever 108 involves brackets 113 projecting upwardly from the base 14 and a pivot pin 114 carried by the brackets and passing through a slot 115 formed longitudinally in the latch lever 108. The engagement of the pin 114 in the slot 115 allows the lever 108 to be oscillated or rotated about the axis of the pin and the slot allows the lever 108 to be shifted longitudinally of the lever or in a substantially horizontally direction since the lever is located in the lower portion of the case and is substantially horizontal.

The drive K for the platen includes a rocker 120 pivotally supported by the pivot shaft 102 which extends rearward in the case. The rocker includes spaced depending lever arms 121 and 122 connected to operate as a unit by means of a connecting plate 103. The rocker also includes a horizontally extending lever arm 104 which projects from arm 122. The shaft 102 being supported by parts 45 and 46 of the base to extend rearwardly in the case, the arm 104 extends transversely of the case and intersects the path of the hook head 112 on the forward end of the short arm 111. When the rear end of the long arm 110 is down and the latch lever 108 is in a forward position where it is normally yieldingly held through the action of a spring 123, the head 112 overlies the upper edge of arm 104. With the parts in this position upward movement of the outer or rear end of lever arm 110 causes the latch lever 108 to rock about pin 114 moving latch 112 downward and consequently moving the lever 104 down. When the lever 104 has been moved to its down position rearward shifting of the latch lever 108 as indicated by the arrow X in Fig. 7, and as permitted by the slot 115 cooperating with pivot pin 114, causes the latch head 112 to be withdrawn from the lever 104, as shown in Fig. 14.

A helical tension spring 130 is connected to the lower end of the lever arm 122 and is anchored at 131. This spring is put under tension as lever 104 is moved down and lever 122 is swung toward one side of the case. When the latch head 112 is released from lever 104 the spring 130 swings the rocker 120 back toward its original or initial position. A pusher arm 132 projects from arm 104 to extend beneath the platen 94. The release of the lever 104 as above described is sudden, with the result that the pusher arm 132 engaged under the platen suddenly moves or throws the platen upwardly causing it to strike against the printing plate through the intervening folder and the inking ribbon 93. The rocker 120 is stopped in the position shown in Figs. 7 and 12 of the drawings by a stop ear 140 projecting from the base 14 and a cooperating stop ear 141 projecting from lever 122, these parts being shown in Figs. 7 and 11 of the drawings. A tension spring 142 may be connected between the platen 94 and rocker 120 to hold the platen down in order to prevent a double impression of the printer.

The lever 100 of the printer provided for feeding the ribbon 93 is shown operatively connected with the rocker 120 through a rocker arm 150 carried on a pivot pin 151, which rocker arm has engagement with a projection 152 on the lever 100 and is pivotally connected to a connecting rod 153 slackly coupled to arm 121 by a pivot pin 154 engaged in a slot 155 as shown in Fig. 12 of the drawings. Through this connection each time the rocker 120 is operated, as above described, the lever 100 is operated to feed the ribbon 93.

The coin control mechanism L governs control of the mechanism hereinabove described and it may, in practice, involve any suitable coin control device suitably coupled or related to the operating parts that I have described. In the case illustrated the coin control mechanism L involves, generally, a coin receiving chute 160 the entrance of which is in register with the coin slot 26 in the riser 21. The chute 160 serves to deliver the coin to a coin selecting and ejecting device 161 located in the case between the riser 21 and the back 18 as shown in Fig. 5. A coin delivery chute 162 directs good coins from the mechanism 161 to a pocket 163 in the plate 105, while a discard chute 166 conducts coins rejected by the mechanism 161 to a return pocket 167 in the part made accessible by the notch 27 in the side of the hood of case B. The mechanism that I have provided includes a rocker carried by a pivot pin 168 which rocker has an arm 169 coupled to an operating spring 169ª, and has an arm 170 carrying a stop head 171 and an operating roller 172. The arm 170 is located to be adjacent the plate 105 and the roller 172 is carried on a pivot pin 173 projecting from the arm 170 so that the roller is in the path of a coin 174 located in the pocket 163.

Figure 8:
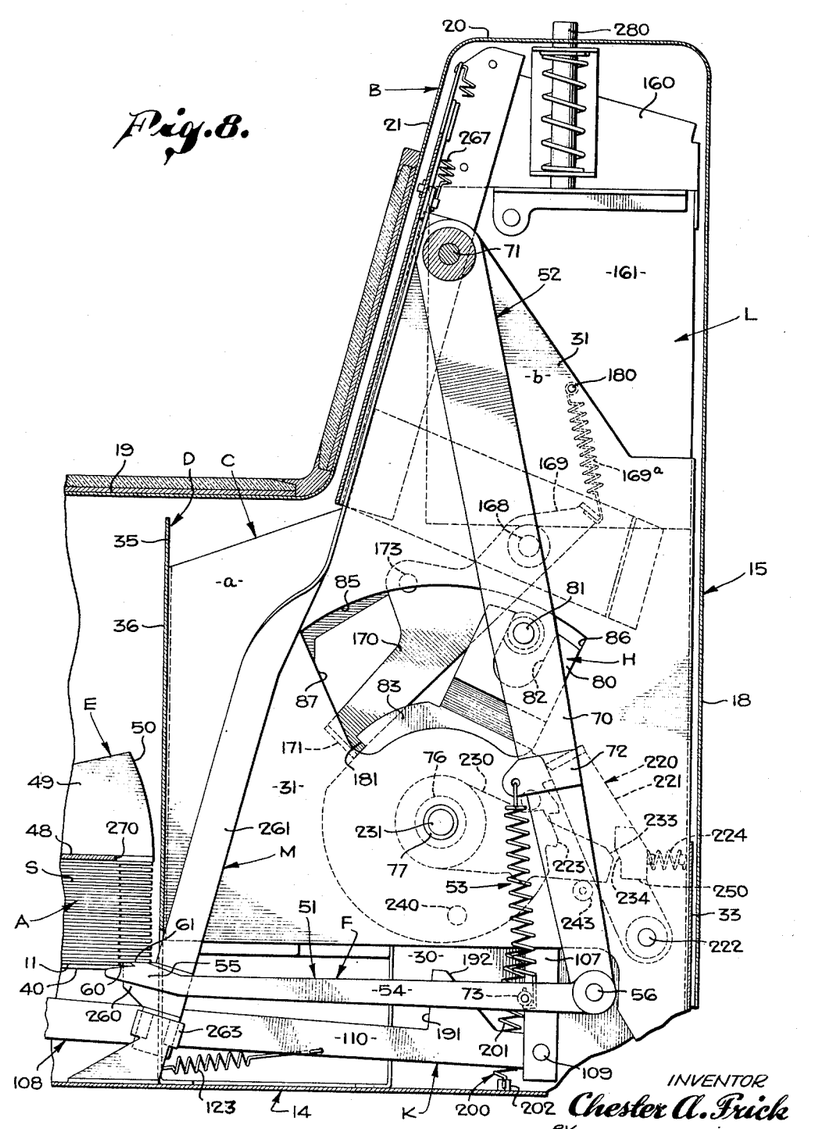
Fig. 8 is a detailed view taken substantially as indicated by line 8—8 on Fig. 6, showing the parts positioned as shown in Fig. 7.
Figures 9, 10:
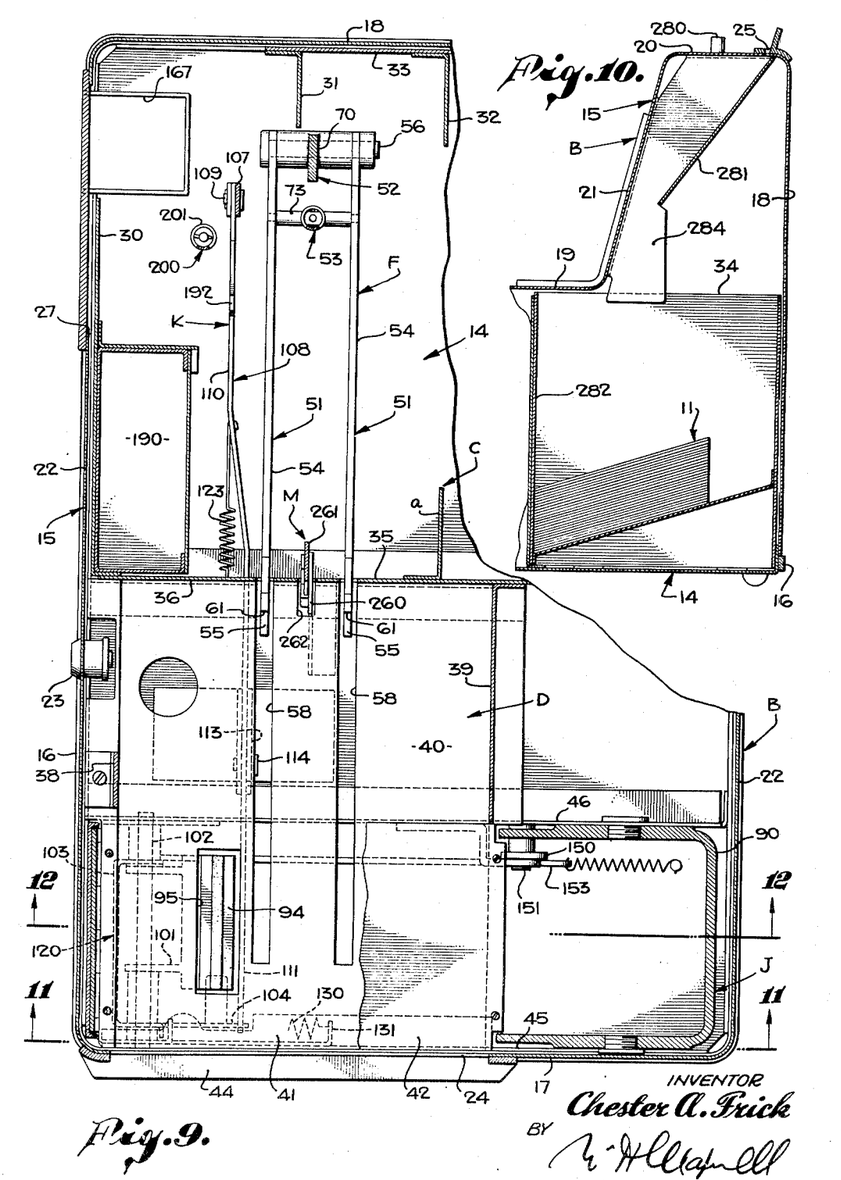
Fig. 9 is a plan view taken substantially as indicated by line 9—9 on Fig. 7.
Fig. 10 is a reduced sectional view taken substantially as indicated by line 10—10 on Fig. 6.
Figure 11:
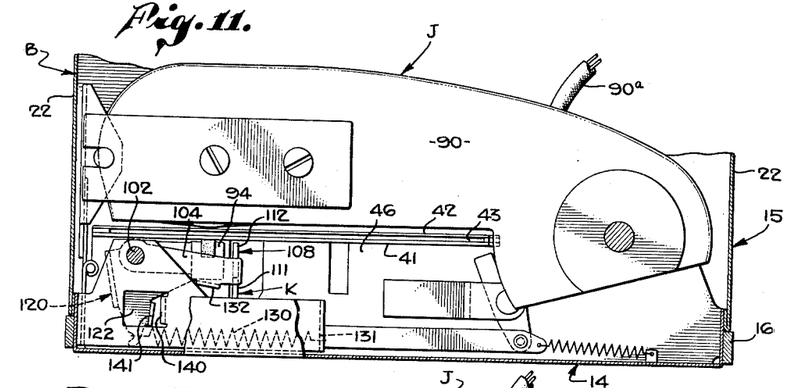
Fig. 11 is a sectional view taken as indicated by line 11—11 on Fig. 9.

The spring 169ª is attached to arm 169 and is anchored to plate 31 at 180, so that the arm 169 is normally urged upwardly while arm 170 is normally urged downwardly. When the arm 170 is in its down position the stop head 171 is in the path of a stop shoulder 181 on the disc 83, the stop shoulder 181 being adjacent the stop head 171 when the parts are in the normal unactuated position as shown in Fig. 8 of the drawings. Any attempt to operate the machine from the normal position shown in Fig. 8 without a coin 174 in pocket 163 will be stopped by the shoulder 181 engaging the stop head 171.

Figure 13:
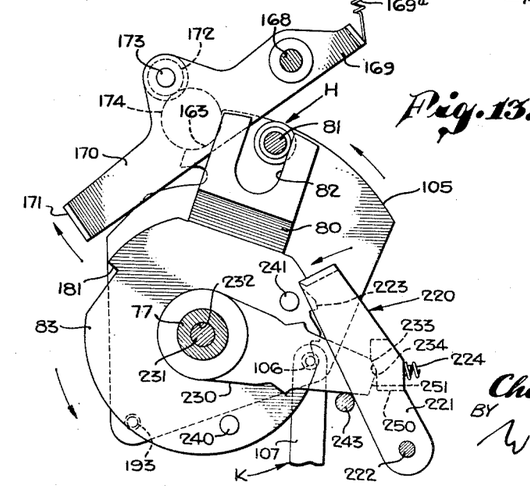
Fig. 13 is a view of a portion of the mechanism shown in Figs. 7 and 8, showing the machine operated far enough to release the catch that is controlled by the coin.

When there is a coin 174 in the pocket 163 as shown in Fig. 7 movement of the plate 105 permitted by slack in the mechanism as above described causes the roller 172 to be lifted so that arm 170 is lifted, moving the stop head 171 out of the path of the stop shoulder 181. In Fig. 13 of the drawings the coin is shown holding the lever 170 in the released position where the disc 83 and plate 105 are free to be moved through operation of the manual lever 75 to cause full operation of the machine. As operation continues after lifting of the lever 170 the disc 105 reaches a position where the coin 174 falls out of the pocket 163 into a coin receptacle 190 located in the case immediately rearward of the magazine D.

As the mechanism is operated after having been released through the action of a coin as above described the rear end portion of the long arm 110 of latch lever 108 is elevated to a position such as is shown in Fig. 14 and when in this elevated position a shoulder 191 provided on a lug 192 projecting upwardly from the arm 110 is in the path of a pin 193 projecting from the plate 105. The engagement of the pin 193 with the shoulder 191 causes the latch lever 108 to be shifted rearwardly in the case, this movement being allowed by the link 107 and the pin and slot connection 114 and 115. The parts are arranged and proportioned so that the latch lever 108 is shifted rearwardly to disengage the head 112 from lever 104 at the time that it is desired to apply the marking or printing to the folder being dispensed from the machine. It is to be understood that when the stamping mechanism or the platen of the printing mechanism is released the folder to be marked or printed upon is being advanced through the passage 43. The action of the platen, however, is rapid, being under the influence of the spring 130 so that the printing is done by a sudden blow or hammer action, with the result that a satisfactory imprint is obtained even though the folder is in the course of being dispensed.

The mechanism that I have provided includes a return means 200 preferably in the form of a helical tension spring 201 anchored to the base 14 at 202 and connected to the plate 105 at 203. As the mechanism is operated from its normal position as above described, the spring 201 is tensioned and as soon as the operation has been completed and the manual lever is released the spring 201 returns the plate 105 to its normal unactuated position with consequent return of the various parts of the mechanism to their normal unactuated position.

My invention further provides means to check retraction of the mechanism after it has started operation until such time as the operation has been completed. I preferably provide a ratchet means 220 which may involve a pawl 221 carried by a pivot pin 222 mounted on plate 31. The pawl cooperates with suitable ratchet teeth 223 provided in the periphery of disc 83 the pawl and ratchet teeth being related so that the teeth ratchet beneath the pawl as the mechanism is operated checking reverse or return movement of the mechanism. A spring 224 normally yieldingly urges the pawl into cooperative engagement with the teeth of the disc 83. I preferably locate the first tooth 223 of the ratchet means 220 so that when it has been engaged the stop shoulder 181 moved beneath the latch head 171 so that even though the latch head is dropped or returned by discharge of the coin forward movement of the mechanism is not checked.

Release means is provided in connection with the ratchet mechanism 220 so that the pawl 121 is moved out of operating position upon the mechanism as a whole being moved to its fully operated position. This release means involves, generally, a release arm 230 carried by the bearing 77 adjacent plate 31. A shaft 231 is carried in a central opening 232 provided in the bearing 77 to support the inner end of shaft 76. The outer end of the release arm 230 is provided with a cam face 233 positioned to cooperatively engage a cam face 234 on a lug 250 located on the pawl 221. The release arm 230 is free to move or rotate independently of the disc 83 and it is operated by spaced operating pins 240 and 241 projecting from the disc 83. A support or rest 243 normally holds the stop arm 230 in position ready for operation.

As the mechanism is operated the pin 240 advances toward the release arm 230 and as the operation of the mechanism moves to completion the pin 240 engages the arm 230 and moves it from the position shown in Fig. 13 to that shown in Fig. 14, during which time the cam face 233 of the arm cooperates with the cam face 234 of the pawl causing the pawl to be moved in the direction indicated by the arrow Y in Fig. 14, disengaging the pawl from the teeth 223. The end 251 of the arm 230 engages the lug 250 holding the pawl disengaged from the teeth. As the mechanism is returned from the fully operated position to the normal unactuated position the pin 241 on disc 83 moves toward the arm 230, and as the mechanism finally approaches the normal position the pin 241 engages and operates the arm 230 disengaging the arm 230 from the lug 250.

The lockout means M serves to close the machine against operation when the supply of folders has been exhausted from the magazine D. The means M, as shown in the drawings includes, generally, a finger 260 projecting from a shiftable rod 261 to normally engage under the stack or supply S of folders as shown in Fig. 8. The finger engages the folders or the lowermost folder through a slot 262 in the bottom 40 of the magazine. The rod 261 is slidably carried in guideways 263 and extends upwardly in the case to the vicinity of the coin slot 26 in the riser 21. At this point in the case the rod 261 is pivotally connected to an arm 265 of a bell crank which has an arm 266 positioned to enter and occupy the coin slot 26 when the rod 261 is allowed to move upwardly under the influence of a spring 267. The spring 267 is a light, helical tension spring having sufficient strength to counterbalance the weight of the rod 261 and the operating parts connected therewith and to cause the finger to normally yieldingly bear upwardly against the lowermost folder in the magazine without displacing the folder or lifting it from its proper operating position in the magazine. When the last folder has been dispensed from the magazine the finger is free to move up through the slot 262 and therefore the rod 261 is free to be moved up by the spring 267 moving the arm 266 of the bell crank coupled to the rod 261 into position to close the coin slot 26. If the plate 48 of means E is such as to overlie the finger 260 the plate will be provided with a notch 270 to freely pass the finger.

The particular coin segregating mechanism 161 shown in the drawings is such as to eliminate or separate bogus, defective or improper coins from those intended to operate the machine and such coins are dispensed from the mechanism 161 into the chute 166 by operation of a return button 280 located at the top step part 20 of the hood.

It is to be observed that the various working parts of the mechanism hereinabove described are grouped together within the case adjacent the side 22 of the case where the operating lever 75 is located. The deposit slot or opening 25 in the top step of the hood is located adjacent the other side of the case so that coupons 11 inserted through the slot 25 strike a guide baffle 281 located between the riser 21 and the back 18 of the case, which guide baffle 281 directs the coupon into a coupon receptacle 282 located adjacent the outer side of the plate 32 of frame C. Side plates 284 may be provided in connection with the guide baffle 281 to direct the coupons deposited through opening 25 so that they are stacked neatly in the receptacle 282 as shown in the drawings.

The guide 281 located between the deposit opening and the receptacle is shaped as shown in the drawings, so that as applications or coupons are deposited through the opening they are stacked neatly and one above the other in the receptacle, thereby establishing the order in which these coupons have been deposited in the machine and serving as a check against fraud. It will be apparent that the owner of the machine may so handle the deposited coupons as to maintain them in the deposited order, for instance, they may be stapled, glued, bound, or otherwise fixed together either permanently or semi-permanently following their removal from the machine.

In the form of my invention illustrated in Figs. 15 to 17 of the drawings the general form of the machine remains the same as hereinabove described except for those parts concerned with the means F, J, and K. The marker J' that I have shown in Figs. 16 and 17 is a perforator and not a printer as above described and it may involve a standard or typical electrically operated time perforating or stamping mechanism the principal parts of which are housed in a case 290, the mechanism being driven electrically through a line 290ª. The perforating device illustrated has a plurality of punch discs 291 carried on a shaft 292 located above the extension 41 of the magazine in the same manner as the discs 91 of the time printer of means J. A die plate 293 is carried by suitabled brackets 294 to occur beneath the folder as the folder moves through passage 43 and the die plate in accordance with structure common to this type of device has suitable holes which register with the punches of the discs 291. A plurality of holes occurs on the die plate in a uniform grid like pattern and the punches of each disc 291 cooperate with certain of the holes in a manner to punch the desired symbols or markings in the folder. In Fig. 15 I have shown a folder A' having typical perforated symbols punched therein, and it will be obvious that as the punches cooperate with the die plate they pass completely through the folder A' and consequently the perforated symbols or markings are applied to both leafs 10' and 11' of the folder. A transferable material is not required in this form of my invention.

The means K' shown in Figs. 16 and 17 of the drawings operates the means J' to stamp the folder A' as the folder moved through the passage 43. The shaft 292 of means J' is carried on a rocker 295 pivotally mounted in the case 290 by a pivot pin 296. The shaft 292 is carried by spaced arm portions 297 of the rocker. The means K' involves generally an operating lever 300, an operating shaft 301 and a trip means 302. The lever 300 is a simple lever pivotally carried by a pin 303 supported by a bracket 304 from the base 14 and has an arm 306 extending forward and terminating beneath the rocker of the means J', and has an arm 307 extending rearwardly to be engaged by the trip means 302. The rocker has a lever portion 308 coupled to the arm 306 by a link 310.

The trip mechanism 302 is operated from plate 105 by an arm 311 projecting from shaft 312 of the trip mechanism and a link 313 connecting arm 311 to the plate through a pin 314. A latch 315 is pivoted on arm 330 carried by shaft 312, by a pivot pin 320 and has a shoulder 321 normally engaged with the end of the arm 307. A cam surface 322 on the latch cooperates with a fixed pin 323 so that when shaft 312 is turned in the direction indicated by the arrow in Fig. 16 the latch is moved away from arm 307 releasing the arm so it is operated by spring 325. A spring 326 normally urges the latch 315 to a position to engage arm 307.

The means F' illustrated in Fig. 16 is substantially the same as the means F hereinabove described. In this form of my invention the ejector fingers 335 are telescoping parts yieldingly held in an extended position as shown in Fig. 16 by a spring 336. The fingers 335 have base portions 337 carrying spaced pins 338 and have extending portions 339 having suitable slots or guideways 340 cooperating with the pins 338 to secure the portions together in slidable engagement. Lugs project from portions 337 and 339 and are coupled together by spring 336 to yieldingly hold the portion 339 in an extended position. When the perforations are being applied by the means J' the means F' above described allows the folder A' to halt momentarily while the perforations are being applied.

From the foregoing description it is believed that the operation of the machine will be fully understood. A person attempting unauthorized operation of the machine is checked through the mechanism that I have described. However, when a proper coin is placed in the coin slot 26 it is handled by the coin mechanism to be deposited in the pocket provided in the plate 105. With a coin in the pocket of the plate 105 the machine can be fully operated and as it is operated the lowermost folder in the magazine is dispensed from the magazine to a position such as is shown in Fig. 14, so that the operator can readily withdraw the folder from the machine. When the operating lever is released the means 200 returns the mechanism to the initial or unactuated position ready for a second operation. The person receiving the folder A may place it upon the lower step of the hood to conveniently write upon any parts requiring to be filled out, and the coupon portion 11 of the folder may be detached from the large leaf or portion 10 and when detached the leaf 11 can be conveniently inserted in the opening 25 to be conveniently stacked in the receptacle 282.

It will be apparent that all of the working parts of the mechanism, as well as the magazine coin receptacle and coupon receptacle are readily accessible when the hood of the case is detached from the base and removed therefrom.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In a machine of the character described, a printer including two cooperating elements one shiftable relative to the other, a spring actuated rocker normally urged toward the shiftable element to move it toward the other element, and a slidably pivoted latch lever engageable with the rocker pivotally movable to retract the rocker and shiftable to release the rocker for operation of the shiftable printer element.

2. In a machine of the character described, a printer including two cooperating elements one shiftable relative to the other, a rocker pivotally mounted to engage the shiftable printer element, a spring normally yieldingly urging the rocker toward said element, a latch lever engageable with the rocker, means slidably pivotally supporting the lever, means rocking the lever to retract the rocker, and means shifting the lever out of engagement with the rocker when the rocker is retracted releasing the rocker to move the said element.

3. In a machine of the character described, a printer including two cooperating elements one shiftable relative to the other, a spring actuated rocker normally urged toward the shiftable element to move it toward the other element, a slidably pivoted latch lever engageable with the rocker pivotally movable to retract the rocker and shiftable to release the rocker for operation of the shiftable printer element, drive means including a manually rotated member, a crank mechanism operatively connecting the rotating member and the latch lever to oscillate the latch lever from the rotating member, and a part operated by the rotating member shifting the latch lever to release it from the rocker when the rocker is retracted.

4. In a machine of the character described, a printer including two cooperating elements one shiftable relative to the other, a spring actuated rocker normally urged toward the shiftable element to move it toward the other element, a slidably pivoted latch lever engageable with the rocker pivotally movable to retract the rocker and shiftable to release the rocker for operation of the shiftable printer element, drive means including a manually rotated shaft, a plate driven by the shaft, a link pivoted to the latch lever and pivoted to the plate offset from the shaft so the latch lever is turned when the shaft is rotated, and cam means driven through the plate shifting the latch lever and releasing it from the rocker when the rocker is retracted.

5. In a machine of the character described, a printer including two cooperating elements one shiftable relative to the other, a spring actuated rocker normally urged toward the shiftable element to move it toward the other element, a slidably pivoted latch lever engageable with the rocker pivotally movable to retract the rocker and shiftable to release the rocker for operation of the shiftable printer element, drive means including a manually rotated shaft, a plate driven by the shaft, a link pivoted to the latch lever and pivoted to the plate offset from the shaft so the latch lever is turned when the shaft is rotated, a projection on the latch lever, and a member projecting from the plate and engaging the projection to shift the latch lever out of engagement with the rocker when the rocker is retracted.

CHESTER A. FRICK.

REFERENCES CITED

The following references are of record in the file of this patent:

UNITED STATES PATENTS

| Number | Name | Date |
|---|---|---|
| 523,384 | Tirrell et al. | July 24, 1894 |
| 640,963 | Sibley | Jan. 9, 1900 |
| 873,936 | Ford et al. | Dec. 17, 1907 |
| 923,085 | Smith | May 25, 1909 |
| 1,011,319 | Church | Dec. 12, 1911 |
| 1,014,016 | Melchert | Jan. 9, 1912 |
| 1,110,034 | Baldwin | Sept. 8, 1914 |
| 1,185,045 | Barill | May 30, 1916 |
| 1,186,887 | Cooley | June 13, 1916 |
| 1,268,564 | Grover | June 4, 1918 |
| 1,344,909 | Lederman | June 29, 1920 |
| 1,506,491 | Kline | Aug. 26, 1924 |
| 1,540,715 | Riikonen | June 2, 1925 |
| 1,831,429 | Swearingen | Nov. 10, 1931 |
| 1,886,425 | Rawitzki | Nov. 8, 1932 |
| 2,103,367 | Hoban | Dec. 28, 1937 |